(12) United States Patent
Narayan et al.

(10) Patent No.: US 10,162,374 B2
(45) Date of Patent: Dec. 25, 2018

(54) DETERMINING LOAD REDUCTIONS IN DEMAND RESPONSE SYSTEMS

(75) Inventors: Amit Narayan, Cupertino, CA (US); Abishek Bahl, San Francisco, CA (US); Vijay Srikrishna Bhat, San Francisco, CA (US)

(73) Assignee: AutoGrid Systems Inc., Redwood Shores, CA (US)

( * ) Notice: Subject to any disclaimer, the term of this patent is extended or adjusted under 35 U.S.C. 154(b) by 554 days.

(21) Appl. No.: 14/345,391

(22) PCT Filed: Sep. 14, 2012

(86) PCT No.: PCT/US2012/000401
§ 371 (c)(1),
(2), (4) Date: Mar. 23, 2015

(87) PCT Pub. No.: WO2013/039556
PCT Pub. Date: Mar. 21, 2013

(65) Prior Publication Data
US 2015/0192945 A1 Jul. 9, 2015

Related U.S. Application Data

(60) Provisional application No. 61/535,949, filed on Sep. 17, 2011, provisional application No. 61/535,950, (Continued)

(51) Int. Cl.
*G05F 1/66* (2006.01)
*G06Q 10/04* (2012.01)
(Continued)

(52) U.S. Cl.
CPC .............. *G05F 1/66* (2013.01); *G05B 15/02* (2013.01); *G06Q 10/04* (2013.01); *G06Q 50/06* (2013.01);
(Continued)

(58) Field of Classification Search
CPC .................................. G05F 1/66; G05B 15/02
See application file for complete search history.

(56) References Cited

U.S. PATENT DOCUMENTS

| 7,519,485 B2 | 4/2009 | Macgregor |
| 8,135,499 B2 | 3/2012 | Haugh |

(Continued)

FOREIGN PATENT DOCUMENTS

| WO | 2013039553 A1 | 3/2013 |
| WO | 2013039554 A1 | 3/2013 |

(Continued)

OTHER PUBLICATIONS

Yamaguchi, "Regression models for demand reduction based on cluster analysis of load profiles." Sustainable Alternative Energy (SAE) IEE PES/IAS Conference on, IEEE, Piscataway, NJ, US (Sep. 28, 2009).

(Continued)

*Primary Examiner* — Nathan L Laughlin
(74) *Attorney, Agent, or Firm* — Henry J. Cittone; Cittone Demers & Arneri LLP

(57) ABSTRACT

The present invention relates to a signal processing technique for characterization of baseline noise, and for determining load reduction in presence of baseline noise. The method utilizes sparse signal processing algorithm to recover demand resource response signal and a plurality of SNR enhancement strategies are then applied to demand resource response signal for enhancing the signal to noise ratio.

5 Claims, 2 Drawing Sheets

Related U.S. Application Data filed on Sep. 17, 2011, provisional application No. 61/535,951, filed on Sep. 17, 2011.

(51) Int. Cl.

| | |
|---|---|
| *G06Q 50/06* | (2012.01) |
| *H02J 3/00* | (2006.01) |
| *H02J 3/14* | (2006.01) |
| *G05B 15/02* | (2006.01) |

(52) U.S. Cl.
CPC ............... *H02J 3/008* (2013.01); *H02J 3/14* (2013.01); *H02J 2003/003* (2013.01); *H02J 2003/007* (2013.01); *Y02B 70/3225* (2013.01); *Y02E 40/76* (2013.01); *Y02E 60/76* (2013.01); *Y04S 10/54* (2013.01); *Y04S 10/545* (2013.01); *Y04S 20/222* (2013.01); *Y04S 40/22* (2013.01); *Y04S 50/10* (2013.01)

(56) References Cited

U.S. PATENT DOCUMENTS

| | | | |
|---|---|---|---|
| 8,219,259 B2 | 7/2012 | Haugh | |
| 2008/0077232 A1 | 3/2008 | Nishide | |
| 2009/0045976 A1 | 2/2009 | Zoldi | |
| 2009/0106571 A1 | 4/2009 | Low | |
| 2009/0240381 A1 | 9/2009 | Lane | |
| 2010/0179704 A1 | 7/2010 | Ozog | |
| 2010/0306027 A1 | 12/2010 | Haugh | |
| 2012/0078434 A1* | 3/2012 | Hindi ........................ | H02J 3/14 700/296 |
| 2012/0109388 A1 | 5/2012 | Haugh | |
| 2012/0136496 A1* | 5/2012 | Black ........................ | H02J 3/14 700/291 |
| 2012/0226930 A1 | 9/2012 | Colban | |

FOREIGN PATENT DOCUMENTS

| | | |
|---|---|---|
| WO | 2013039555 A1 | 3/2013 |
| WO | 20130309556 A1 | 3/2013 |

OTHER PUBLICATIONS

Yousefi, "Optimal real time pricing in an agent-based retail market using a comprehensive demand response model," Energy, Pergamon Press, Oxford, 36(9): 5716-5727 (Jun. 20, 2011).
Fan, "A real-time implementation of short-term load forecasting for distribution power systems," IEEE transactions on power systems. 9(2):988-994 (May 1, 1994).
Vaziri, "Smart grid, Distributed Generation, and standards," Power and Energy Society General Meeting, 2011 IEEE, IEEE, pp. 1-8 (Jul. 24, 2011).
Mohagheghi, "Demand Response Architecture: Integration into the Distribution Management System", Smart Grid Communications, 2010 First IEEE International Conference, IEEE, Piscataway, NJ, USA, (Oct. 4, 2010), pp. 501-506, XP031790278, ISBN: 978-1-4244-6510-1.
Andersson, "Intelligent load shedding to counteract power system instability", Transmission and Distribution Conference and Exposition: Latin America , 2004 IEEE/PES Sao Paulo, Brazil (Nov. 8, 2004), Piscataway, NJ, USA,IEEE, (Aug. 11, 2004), pp. 570-574, XP010799925, DOI: 10.1109/TDC.2004.1432442ISBN: 978-0-7803-8775-1.
Farrokh, "Intelligent Load Shedding", IEEE Industry Applications Magazine, IEEE Service Center, Piscataway, NJ, US, vol. 17, No. 2, (Mar. 1, 2011), pp. 44-53, XP011344142, ISSN: 1077-2618, DOI: 10.1109/MIAS.2010.939814.
Mathieu, "Variability in automated responses of commercial buildings and industrial facilities to dynamic electricity prices", Energy and Buildings, Lausanne, CH, vol. 43, No. 12, (Aug. 22, 2011) pp. 3322-3330, XP028104123, DOI: 10.1016/J.ENBUILD. 2011.08.020.
Lynch, "Estimation Errors in Demand Response with Large Customers, Applications for Load Research." (Nov. 1, 2009) XP055053852.
Bartholomew, "Response Measurement & Verification." Applications for Load Research11, (Mar. 1, 2009) XP55053592.
Written Opinion of the International Searching Authority dated Mar. 18, 2014 in International Application No. PCT/US2012/000398.
International Preliminary Report on Patentability dated Mar. 18, 2014 in International Application No. PCT/US2012/000398.
International Search Report dated Mar. 3, 2013 in International Application No. PCT/US2012/000398.
International Preliminary Report on Patentability dated Mar. 18, 2014 in International Application No. PCT/US2012/000399.
Written Opinion of the International Searching Authority dated Mar. 18, 2014 in International Application No. PCT/US2012/000399.
Written Opinion of the International Searching Authority dated Mar. 18, 2014 in International Application No. PCT/US2012/000400.
International Preliminary Report on Patentability dated Mar. 18, 2014 in International Application No. PCT/US2012/000400.
International Search Report dated Feb. 14, 2013 in International Application No. PCT/US2012/000400.
International Search Report dated Feb. 26, 2013 in International Application No. PCT/US2012/000401.
International Search Report dated Mar. 20, 2014 in International Application No. PCT/US2013/069768.
Written Opinion of the International Searching Authority dated Mar. 20, 2014 in International Application No. PCT/US2013/069768.
International Preliminary Report on Patentability dated May 1, 2015 in International Application No. PCT/US2013/069768.
Supplementary European Search Report dated Mar. 11, 2016 in Application No. EP 13 85 5119.

* cited by examiner

DETERMINING LOAD REDUCTIONS IN DEMAND RESPONSE SYSTEMS

CROSS-REFERENCE TO RELATED APPLICATIONS

This application is the U.S. national stage of PCT International Patent Application No. PCT/US2012/000401, filed Sep. 14, 2012, which claims benefit to U.S. Provisional Patent Application No. 61/535,949, filed Sep. 17, 2011, U.S. Provisional Patent Application No. 61/535,950, filed Sep. 17, 2011, and U.S. Provisional Patent Application No. 61/535,951, filed Sep. 17, 2011, the disclosures of each of which are incorporated herein by reference.

FIELD OF THE INVENTION

The present invention relates generally to baseline noise, and more particularly a signal processing techniques to characterize baseline noise, and technique to determine load reduction in the presence of baseline noise.

BACKGROUND OF THE INVENTION

In many demand response programs, a customer is given an incentive to reduce electricity consumption in response to high prices or other conditions on the grid. To calculate these payments, the utility company has to estimate how much the 'normal' consumption for the customer would have been in the absence of a DR event. This estimated consumption is called the baseline.

The baseline is typically calculated using a mathematical formula such as the average consumption of a certain number of most recent 'similar' days which can be further adjusted by weather information. The DR day consumption is then compared to the actual usage to determine the credits a customer has earned for reducing the electricity consumption.

Since there is some amount of day-to-day or hour-to-hour variation in the normal consumption of a customer, the baseline value inherently is inaccurate. The daily variation in the consumption pattern is called the 'noise' in the baseline consumption.

Traditional baseline techniques have faced an important challenge with participation of small loads in demand response programs to determine the baseline and load-shed. A baseline can be inherently noisy; it can be very difficult to separate a small load-shed under the statistical noise of baseline energy consumption of the whole building meter.

The baseline computation techniques separate the load-shed signal from the random baseline noise.

The signal processing techniques can be enough to meet the rigorous requirements of the settlement of ISO/RTO managing the DR programs. In cases where the signal-to-noise power ratio (SNR) is very small and during the deployment of ultra-low power sensor with limited battery life, the problem of separating signal from ambient noise occurs.

The signal with low SNR can be recovered reliably in one of the three settings namely the signal with time domain (e.g. signal is sparse) or the signal with frequency domain (e.g. the wavelet coefficients have a tree like structure) or the signal with impact on a number of measurable quantities (e.g. multiple cameras can view the same object from slightly different angles).

Recently, Bayesian methods have also been applied to this estimation problem in order to provide prior knowledge of the environment and the signal.

The present invention relates to modern signal processing techniques that are able to decorrelate these signals and increase accuracy. Signal processing techniques are developing to detect small systematic load reduction in response to demand response price in relatively noise baseline environment.

Given that baseline usage can be inherently noisy, it can be hard to separate a small load-shed within the statistical error of baseline energy consumption model derived from the whole building meter.

By combining advanced signal processing techniques and the domain-specific engineering knowledge of the underlying data, DROMS-RT will allow separation of small systematic load sheds as per the stringent requirements of the settlement departments of the utilities or ISO/RTO managing the DR programs.

Abbreviation and Definition

DROMS-RT: Demand Response Optimization and Management System for Real-Time
DR: Demand Response
DER: Distributed Energy Resource
FE: Forecasting Engine
OE: Optimization Engine
BE: Baseline Computation and Settlement Engine
SaaS: Software-as-a-Service
SNR: signal-to-noise power ratio
DROMS-RT: DROMS-RT is a highly distributed Demand Response Optimization and Management System for Real-Time power flow control to support large scale integration of distributed generation into the grid.

Demand Response (DR): Demand Response (DR) is a mechanism to manage customer consumption of electricity in response to supply conditions. DR is generally used to encourage consumers to reduce demand, thereby reducing the peak demand for electricity. It refers to any demand side management program where customers adjust their usage in response to an event or price signal from the supplier. These include direct load control programs, price based demand response programs such as critical peak pricing and other dynamic pricing programs, rebate based programs, and capacity and demand bidding programs, and reliability based programs. The programs could be for capacity, energy, or ancillary services markets.

Distributed Energy Resource (DER): Distributed Energy Resource (DER) systems are small-scale power generation technologies (typically in the range of 3 kW to 10,000 kW) used to provide an alternative to or an enhancement of the traditional electric power system.

Software-as-a-Service (SaaS): Software-as-a-Service (SaaS) model provides a platform to reduce the cost of deployment and facility, and allow all small commercial and residential customers to participate in demand response.

Forecasting Engine (FE): The Forecasting Engine (FE) gets the list of available resources from the resource modelers; its focus is to perform short-term forecasts of aggregate load and available load-sheds for individual loads connected to DROMS-RT Optimization Engine (OE): The Optimization Engine (OE) takes the available resources and all the constraints from the DRM and the forecasts of individual loads and load-sheds and error distributions from the FE to determine the optimal dispatch of DR under a given cost functions.

Baseline Computation and Settlement Engine (BE): BE engine uses signal processing techniques to identify even small systematic load sheds in the background of very large base signals.

Signal-to-noise power Ratio (SNR): Signal-to-noise ratio (SNR) is used for measurement in science and engineering. It is defined as the ratio of signal power to the noise power.

SUMMARY OF THE INVENTION

In an aspect of the present invention a signal processing method that are used in baseline computation engine for detecting small signals in the background of very large baseline signals is provided. The method determines the baseline signals and reduces the loads in the presence of the baseline noise.

The method for determining systemic load reduction in response to demand response price in presence of a baseline noise comprises: collecting an aggregate power consumption data at a particular period of time for a DR event; partitioning the power consumption data into a predicted baseline consumption data, an error power and a DR response signal; recovering the sparse DR response signals using signal processing algorithm; employing a plurality of SNR enhancement strategies across a multiple of DR events for improving SNR of the DR signal; selecting the DR response signal and identifying period and locations of high and low predicted error power; regulating the DR resources to individual user in response to the error power associated with the DR event.

BRIEF DESCRIPTION OF THE DRAWINGS

The preferred embodiment of the invention will hereinafter be described in conjunction with the appended drawings provided to illustrate and not to limit the scope of the invention, wherein like designation denote like element and in which.

DESCRIPTION OF INVENTION

DROMS-RT is a highly distributed Demand Response Optimization and Management System for Real-Time power flow control to support large scale integration of distributed generation into the grid.
Demand response programs help in reducing the energy costs and system integrity for a few critical hours during the year. The demand response programs also encourage end customers to reduce load at their facilities, and to participate in the price response program or enter into the forward capacity market through a demand response provider. Demand Response services are substantially less expensive and cleaner than other forms of ancillary services options currently available.

Figure 1:
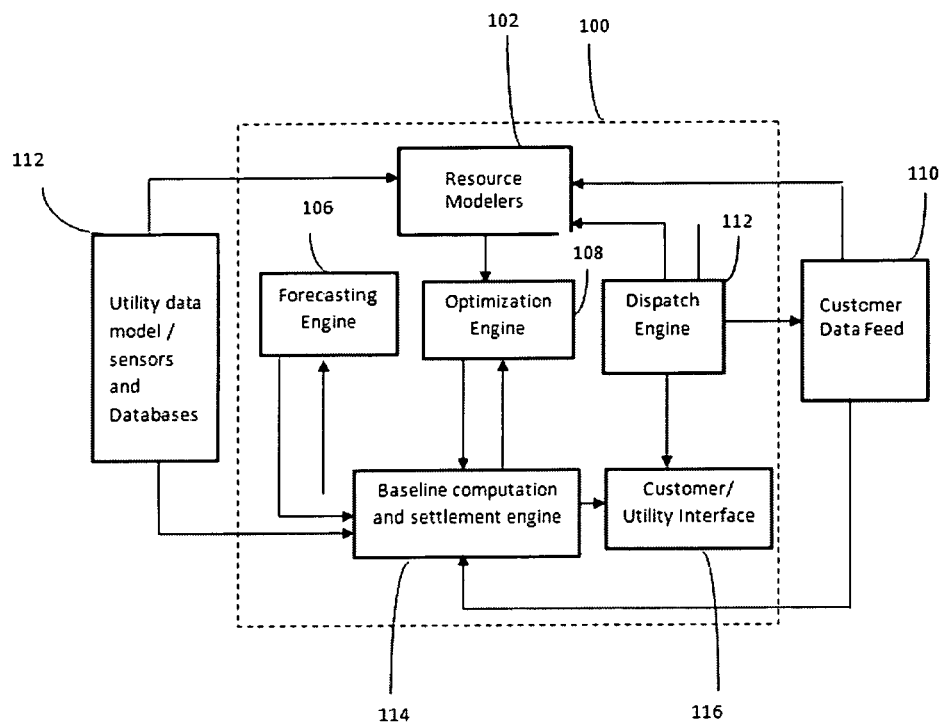
FIG. 1 is a schematic representation illustrating the operation of demand response system for baseline characterization in accordance with an embodiment of the present invention.

FIG. 1 is a schematic representation illustrating the operation of demand response system for baseline characterization in accordance with an embodiment of the present invention. Referring to FIG. 1, the system 100 comprises: a resource modeler 102, a forecasting engine 106, an optimizer 108, a dispatch engine 110, and a baseline engine 114. The system 100 is coupled to the utility's backend data system 104 on one side and customer end-points 112 on the other side.

The DR Resource Modeler (DRM) 102 within the system 100 keeps track of all the available DR resources, their types, their locations and other relevant characteristics such as response times, ramp-times etc. The Forecasting Engine (FE) 106 gets the list of available resources from the DR resource modeler 102. The focus of forecasting engine 106 is to perform short-term forecasts of aggregate load and available load-sheds for individual loads connected to the system 100. The Optimizer 108 takes the available resources and all the constraints from the DR Resource Modeler 102 and the forecasts of individual loads and load-sheds and error distributions from the Forecasting engine 106 to determine the optimal dispatch of demand response under a given cost functions. The Baseline Engine 114 uses signal processing techniques to identify even small systematic load sheds in the background of very large base signals. The system is coupled to customer data feed 112 on one side for receiving live data-feeds from customer end-devices. The system is coupled to utility data feed 104 on another side and the data from the utility data feed 104 is provided to calibrate the forecasting and optimization models to execute demand response events. The system 100 has a dispatch engine 110 that helps in taking decision and uses these resource specific stochastic models to dispatch demand response signals across a portfolio of customer to generate ISO bids from demand response or to optimally dispatch demand response signals to the customer based on the cleared bids and other constraints of the grid. The system uses customer/utility interface 116 connected to baseline engine that provides an interface between the system and customer or the utility.

In practice, of course, some of the feeds might not be available all the time or in real-time; the forecasting engine 106 is also able to run in an "off-line" manner or with partial data feeds in these cases. The goal of the system 100 is to provide near real-time demand response event and price signals to the customer end-points to optimally manage the available demand response resources.

The DR resource modeler 102 also continuously updates the availability of resources affected by commitment to or completion of an event. The DR resource modeler 102 also monitors the constraints associated with each resource such as the notification time requirements, number of events in a particular period and number of consecutive events. It can also monitor user preferences to determine a "loading order" as to which resources are more desirable for participation in demand response events from a customer's perspective, and the contract terms the price at which a resource is willing to participate in an event. The demand response resource modeler 102 also gets data feed from the client to determine whether the client is "online" (i.e. available as a resource) or has opted-out of the event.

The Forecasting engine 106 accounts for a number of explicit and implicit parameters and applies machine learning (ML) techniques to derive short-term load and shed forecasts as well as error distributions associated with these forecasts. The forecasting engine 106 provides baseline samples and the error distribution to the baseline engine 114. In addition, the baseline engine 114 gets the data feeds from the meter which is the actual power consumption data.

In an embodiment of the present invention a signal processing technique that are used in baseline computation engine 114 for detecting small signals in the background of very large baseline signals is provided. The technique determines the baseline signals and reduces the loads in the presence of the baseline noise.

The baseline computation and settlement engine 114 provides the capability of detecting demand reduction in response to DR price notification. A signal processing techniques have been developed to detect small systematic load reduction in response to demand response price in a relative noise baseline environment.

Signal processing is a technique that involves using computer algorithms to analyze and transform the signal in an effort to create natural, meaningful, and alternate representations of the useful information contained in the signal while suppressing the effects of noise. In most cases signal processing is a multi-step process that involves both numerical and graphical methods.

Therefore signal processing is a technique for analysis of signals either in distinct or continuous time to perform useful operation. Signals include sound, images, time-varying measurement values, sensor data, control system signals, telecommunication transmission signals, and radio signals.

Signal-to-noise ratio (SNR) is used for measurement in science and engineering. It compares the level of a desired signal to the level of background noise. It is defined as the ratio of signal power to the noise power. Signal-to-noise ratio is sometimes used informally to refer to the ratio of useful information to false or irrelevant data in a conversation or exchange. DROMS-RT defines the SNR for DR signal as the ratio of the DR signal power to the error power, where the error is defined as sum of the model error and the prediction error.

The problem of verifying whether a set of customers have all met their DR obligations reduces to the problem of detecting small signal (DR related power reduction) in the background of very large signals (baseline power consumption) and erroneous prediction of the baseline power production (model and prediction error). In order to effectively solve this problem, the DROM-RT Baseline engine 114 uses a number of techniques for signal processing domain Baseline Engine 114 deploys state of the art sparse signal processing algorithms to optimally recover DR response signals. These algorithms are optimal to the information theoretic limit, and therefore they cannot be improved unless the "SNR" of the DR signal can be enhanced.

To improve the detection even further, BE 114 employs a number of different SNR enhancement strategies that range from using customer level signal aggregation to using time diversity by spreading settlement across a number of DR events.

In addition, to the SNR enhancement strategies Baseline Engine 114 will exploit the fact that the DR signal is endogenous to the signal processing problem, i.e. DROMS-RT can select the signal. BE can identify periods and locations of high and low error power and tune the DR resource commitment to the error power—commit resources in smaller units when the error power is low and vice versa. This last step requires specific domain-specific knowledge of end user loads and load evolution—off-the-shelf clustering algorithms will be unable to cluster on the error power.

The signal-processing problem is posed as follows. Let $x=(x_1, \ldots, x_t)$ denote the sampled data of aggregate power consumption at a particular node over T periods. The signal $x\_t$ can be partitioned as $x_t = y_t + \in_t - r_t$ where $y_t$ is the baseline power consumption predicted by the forecasting and clustering models, $\in_t$ the prediction noise, and $r_t$ is the DR signal. The signal DR signal $r_t$ is typically small, i.e. $|r_t| \ll |y_t|$ for all t, and also likely to be quite sparse, i.e. $\|r\|_0 = \Sigma_{t=}^T 1(|r_t|>0) \ll T$. Thus, the sparse signal can be recovered by solving an optimization problem of the form $\min \|r\|_0 + \lambda \Sigma p(x_t - y_t + r_t)$ where $p(\bullet)$ denotes the log-likelihood of the error distribution.

This problem is NP-hard and very hard to solve in practice. Under very mild regularity conditions, the solution of this optimization problem can be recovered by solving the linear program $\min \|r\|_1 + \lambda \Sigma p(x_t - y_t + r_t)$ – this LP is very ill-conditioned and one needs to develop special purpose codes to solve it. The current state of the art sparse algorithms can recover a sparse signal at an SNR of approximately 15 dB. Using signal structure, e.g. such as the fact that once "on" these signals tend to remain "on" for a certain specified period one can reduce this to about 10 dB, i.e. when the signal power is approximately equal to the noise power. Going below this lower bound on the SNR is theoretically impossible. This SNR limit highlights the link between the signal processing module and the prediction module. In order to effectively detect DR signals we have to ensure a high enough SNR.

Figure 2:
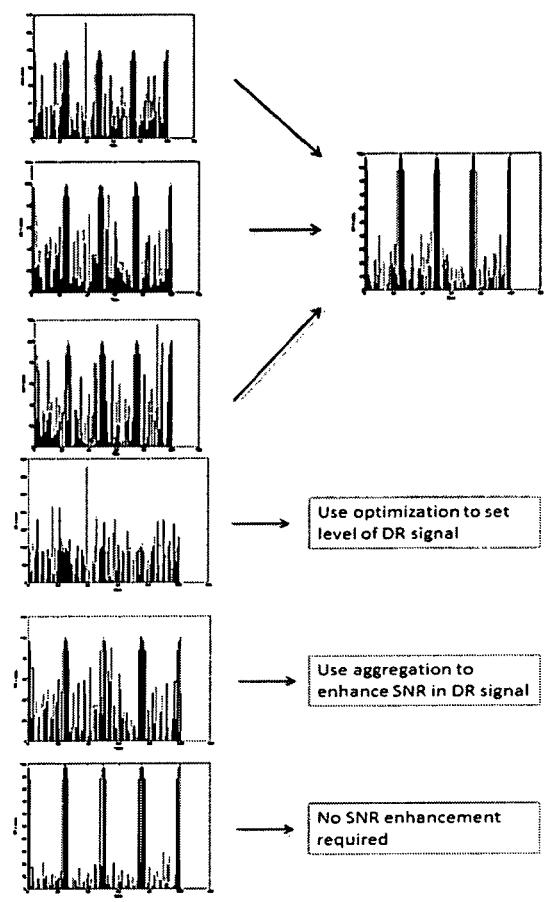
FIG. 2 is a representation illustrating alternate signal enhancement strategies and SNR enhancement via customer aggregation in accordance with an embodiment of the present invention.

FIG. 2 is a representation illustrating alternate signal enhancement strategies and SNR enhancement via customer aggregation in accordance with an embodiment of the present invention.

Referring to FIG. 2, some customer centric strategies for SNR enhancement are as follows. When the prediction error for each customer is independent, the "portfolio effect" of combining customers increases SNR. SNR can also be enhanced by time diversity, i.e. by settling DR based payments averaged over several events. For example, if a small load is shed in one building, it may be impossible to distinguish the change by measuring the whole building meter. However, if the same small load was shed simultaneously at 1000 buildings, the uncharacterized factors tend to be smoothed allowing statistical measurement of the small load shed in each building. When the prediction errors are independent from one period to the next, the "portfolio effect" across time will reduce the noise power whereas the signal component remains relatively constant; once again enhancing SNR. In case of ancillary services, there will be many events during a given time period of a day and we can aggregate data over these events to potentially improve the SNR.

DR is under the control of the optimization engine 108 in DROMS-RT. DROMS-RT clusters customers according to the prediction error and put a constraint in the optimization engine to only execute DR in units that have the requisite SNR. For example, if a particular customer has a large forecasting error, DROMS-RT will exclude the customer from DR or group that customer with 1000 other customers to take advantage of portfolio effect. T The same customer may have relatively large error during some periods and low at other periods (e.g. variable during the day, stable during the night). DROMS-RT can identify this and limit the resource availability only during the periods of relatively smaller model error. DROMS-RT can also exploit time/location information by coupling the scale of the DR resource commitment to the error power.

SNR can also increase by time diversity, i.e. by settling DR based payments averaged over several events. The enhancement of SNR can be achieved in different means. When the SNR is very low, it means one must use the robust optimization engine to ensure that DR load is very high as compare to noise. At intermediate noise levels aggregation over customer classes is sufficient SNR enhancement. At high SNR means it does not require enhancement of SNR and the signal can be fed to the signal processing module.

The signal-to-noise ratio (SNR) is a link between the signal processing module and the machine learning prediction and filtering module. In order to effectively detect DR signal to assure a high enough SNR the prediction error for each customer should be independent. The portfolio effect of customers also increases SNR.

According to the invention, the signal processing techniques improve the information contained in received smart meter data. Normally, when a signal is measured with a smart meter, it is viewed in the time domain (vertical axis is amplitude or voltage and the horizontal axis is time). This is the most logical and intuitive way to view them. Simple signal processing often involves the use of gates to isolate the signal of interest or frequency filters to smooth or reject unwanted frequencies.

The present invention provides signal processing technique that are used in baseline computation engine 114 for detecting small signals in the background of very large baseline signals. The technique determines the baseline signals and reduces the loads in the presence of baseline noise.

The FE engine 106 provides baseline samples and the error distribution to the BE engine 114. In addition the BE engine gets the data feeds from the meter which is the actual power consumption data. The BE uses 'event detection' algorithm to determine if the load actually participated in the DR event, and if so, what was the demand reduction due to this event. The BE engine 114 feeds data back to the FE 106 so that it could be used to improve the baseline forecast.

The goal of the baseline computation and settlement engine 114 is to provide the capability of detecting demand reduction in response to a DR event or price notification. The focus is on developing the ability to detect small systematic load reductions in response to DR events in a relatively noisy baseline environment. Novel signal-processing techniques have been developed and implemented for this purpose.

We claim:

1. A method for determining systemic load reduction in response to demand response price in presence of a baseline noise comprising:

collecting an aggregate power consumption data for a period of time in a demand response event;

partitioning the power consumption data into a predicted baseline consumption data, an error power and a demand resource response signal;

recovering the demand resource response signal using signal processing algorithm;

employing a plurality of Signal-to-Noise Ratio (SNR) enhancement strategies across a multiple of demand response events for improving SNR of the demand resource response signal;

selecting the demand resource response signal and identifying period and locations of high and low predicted error power;

regulating a plurality of resources participating in the demand response event to individual user in response to the error power associated with the demand resource event;

wherein the error power includes a baseline model error and a prediction error;

wherein the baseline model error is error associated with estimation of baseline power and the prediction error is error associated with expected power reduction during the demand response event and wherein the systematic load reduction is determined where the signal x_t at a particular time is partitioned as:

$$x_t = y_t + e_t - r_t$$

where, $x_t$ is observed power $y_t$ is baseline estimate $e_t$ is error power $r_t$ is expected DR reduction.

2. The method of claim 1 wherein the demand resource response signals amount to the systemic load reduction in response to the demand response event.

3. The method of claim 1 wherein a customer aggregation strategy is used as an SNR enhancement strategy.

4. The method of claim 1 wherein the SNR enhancement is performed through time diversity strategy.

5. The method of claim 1 wherein the regulation of the demand resource response (DR) signal comprises committing the DR resources in smaller units when the error power is low and committing the DR resources in larger units when the error power is high.

* * * * *